United States Patent Office 3,124,597
Patented Mar. 10, 1964

3,124,597
N'-SUBSTITUTED N-SULPHONYL-UREAS
Willy Stoll and Henri Dietrich, Basel, Switzerland, assignors to Geigy Chemical Corporation, New York, N.Y., a corporation of Delaware
No Drawing. Filed May 12, 1958, Ser. No. 734,443
Claims priority, application Switzerland May 24, 1957
10 Claims. (Cl. 260—332.2)

The present invention relates to new N'-substituted N-sulphonyl ureas with valuable pharmacological properties, as well as a process for their production.

It has been found that N'-substituted N-sulphonyl ureas of the general formula:

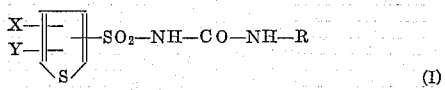
(I)

wherein R represents a member selected from the group consisting of alkyl, alkenyl or cycloalkyl radicals, and X and Y each represent a member selected from the group consisting of hydrogen or halogen atoms, after peroral administration cause a considerable lowering of the level of sugar in the blood.

The compounds defined above can be prepared by reacting a thiophene sulphonamide of the general formula:

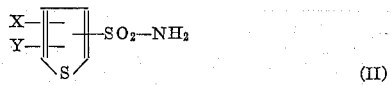
(II)

in which X and Y have the meaning indicated above, or an alkali metal salt thereof, with an alkyl, alkenyl or cycloalkyl isocyanate of the general formula:

$$R—N=C=0 \quad (III)$$

or with a reactive functional derivative of an alkyl, alkenyl or cycloalkyl carbamic acid of the general formula $$R—NH—COOH \quad (IV)$$

if desired in the presence of a condensing agent, and if necessary, partially hydrolysing the N'-substituted N-thiophene sulphonyl guanidine first obtained to the corresponding urea. Suitable functional derivatives of carbamic acids are especially their esters, e.g. low molecular weight alkyl esters, or their halides, as well as the amides, i.e. ureas of the formula R—NH—CO—NH$_2$, and their nitriles, i.e. cyanamides of the formula R—NH—CN, in the case of whose use the above-mentioned guanidines are first formed. Instead of isocyanates may also be used the azides, N-bromamides and N-chloramides of carboxylic acids of the formula R—COOH, which are readily decomposed to isocyanates.

Further, the above-defined compounds may also be prepared by reacting an amine of the general formula:

$$R—NH_2 \quad (V)$$

in which R has the meaning given above, with a thiophene sulphonyl isocyanate of the general formula:

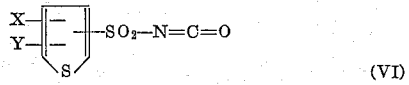
(VI)

or a reactive functional derivative of a thiophene sulphonyl carbamic acid of the general formula:

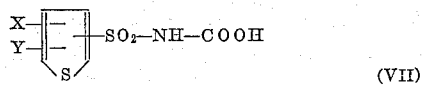
(VII)

in which X and Y have the meaning given above, if desired in the presence of a condensing agent, and if necessary, partially hydrolysing the N'-substituted N-thiophene sulphonyl guanidine first obtained to the corresponding urea. Reactive functional derivatives of the said carbamic acids also especially suitable here are their esters, e.g. low molecular weight alkyl esters or their halides, e.g. chlorides, as well as amides and nitriles, i.e. corresponding N-thiophene sulphonyl ureas and N-thiophene sulphonyl cyanamides.

Furthermore, for the production of the new N'-substituted N-thiophene sulphonyl ureas, thiophene sulphohalides of the general formula:

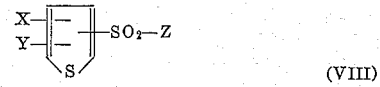
(VIII)

in which Z signifies chlorine or bromine and X and Y have the meaning given above, can be reacted with an ether or the iso-form of an alkyl, alkenyl or cycloalkyl urea of the general formula:

$$H_2N—CO—NH—R \quad (IX)$$

especially a methyl or ethyl ether, and the N'-substituted N-thiophene sulphonyl isourea ether first obtained partially hydrolysed in particular by means of hydrochloric acid, to the corresponding urea.

As condensing agents, especially for the first and second named processes of production, basic condensing agents, such as, for example, alkali metal alcoholates, pyridine or triethylamine, can be used and this especially when the reaction takes place with liberation of an acid. In the case of the first named process of preparation, the thiophene sulphonamides can also be converted into an alkali metal salt before the reaction by treatment with an alkali metal compound and, instead of the free sulphonamides in the presence of a basic condensing agent, their previously formed alkali metal salts can be used for the reaction. On the other hand, hydrogen chloride is particularly suitable as condensing agent for the reactions of thiophene sulphonamides or of amines with alkyl, alkenyl or cycloalkyl cyanamides or with thiophene sulphonyl cyanamides respectively.

Thiophene sulphonic acid derivatives of the general Formulae II and VIII which may be used are, for example, the amides or chlorides of the following thiophene sulphonic acids, which have been collected together by H. D. Hartough in "Thiophene and Its Derivatives," New York, 1952, p. 426:

2-thiophene sulphonic acid, 5-chloro-2-thiophene sulphonic acid, 4.5-dichloro-2-thiophene sulphonic acid, 3-bromo-2-thiophene sulphonic acid, 5-bromo-2-thiophene sulphonic acid, 3.4-dibromo-2-thiophene sulphonic acid, 4.5-dibromo-2-thiophene sulphonic acid, 3-thiophene sulphonic acid and 2.5-dibromo-3-thiophene sulphonic acid.

The amides of the said acids can be reacted, for example with methyl, ethyl, n-propyl, isopropyl, n-butyl, isobutyl, sec. butyl, n-amyl, isoamyl, n-hexyl, β-methylpentyl, n-octyl, β-ethylhexyl, allyl, crotyl, methallyl, cyclopentyl and cyclohexyl isocyante, and also further, for example, with the azides of butyric acid or valeric acid or with N-bromo-butyramide, -valeramide or -isovaleramide.

For use in the second named process of production, suitable amines are, for example, methyl, ethyl, n-propyl, isopropyl, n-butyl, isobutyl, sec. butyl, n-amyl, isoamyl, n-hexyl, β-methylpentyl, n-octyl, β-ethylhexyl, allyl, crotyl, methallyl, cyclopentyl, cyclohexyl and endomethylene-cyclohexylmethyl amines, while in the first named process of production carbamic acid derivatives derived from these amines can be used instead of the isocyanates.

The compounds of the general Formula I which can be produced according to the invention can be converted in the usual way into stable, water-soluble alkali metal salts.

The following example illustrates more precisely the production of the new N'-substituted N-thiophene sulphonyl ureas. The parts given therein are parts by weight; the latter are to parts by volume as grammes to cubic centimetres. The temperatures are given in degrees centigrade.

*Example 1*

24.2 parts of 5-bromo-2-sulphamyl thiophene are dissolved in 50 parts by volume of acetone and converted into the sodium salt by treating with 20 parts by volume of 5 N-caustic soda solution. After this, 10 parts of n-butyl isocyante are allowed to drop in with stirring. After the exothermic reaction has abated, the reaction mixture is boiled under reflux for a further 2 hours. The acetone is then evaporated at reduced pressure, the residue is treated with water and the insoluble by-product is filtered off. By acidifying the filtrate with dilute hydrochloric acid while vigorously stirring, the N-(5-bromothiophene sulphonyl-2)-N'-n-butyl urea is precipitated. By repeated solution in dilute ammonia, decolourisation of the solution with animal charcoal and precipitation with dilute hydrochloric acid, the reaction product can be further purified. After twice recrystallising from ethanol the pure substance melts at 125–127°.

*Example 2*

22.1 parts of N-(thiophene sulphonyl-2)-carbamic acid methyl ester are boiled under reflux for 4 hours with 8 parts of n-butylamine in 50 parts by volume of glycol monomethyl ether. The reaction mixture is then concentrated in vacuum, the residue is dissolved in dilute ammonia, filtered, the filtrate decolourised with animal charcoal and the N-(thiophene sulphonyl-2)-N'-n-butyl urea precipitated therefrom with dilute hydrochloric acid. After recrystallisation from ethanol, it melts at 152–154.5°.

*Example 3*

19.75 parts of 5-chloro-2-sulphamyl thiophene and 13.1 parts of n-propyl carbamic acid ethyl ester in 50 parts by volume of methyl cellosolve are boiled under reflux. A residue is obtained by concentrating in the vacuum, which is dissolved in diluted ammonia and the solution is filtered. The filtrate is decolourised with animal charcoal and the reaction product is precipitated therefrom with diluted hydrochloric acid in the cold.

Recrystallised from alcohol, the pure N-(5-chlorothiophene sulphonyl-2)-N'-n-propyl urea melts at 170.5–172.5°.

*Example 4*

8 parts of n-butylamine in 18 parts by volume of abs. toluene are added dropwise at 10–20° while stirring well and cooling to 28.2 parts of 5-bromothiophene sulphonyl isocyanate-2 in 100 parts by volume of abs. toluene. The whole is then refluxed for 3 hours and the solution is concentrated in the vacuum. The residue is dissolved in diluted ammonia, the solution is decolourised with animal charcoal and filtered. N-(5-bromothiophene sulphonyl-2)-N'-n-butyl urea is precipitated from the colourless filtrate with diluted hydrochloric acid. After recrystallising from alcohol, it melts at 125–127°.

*Example 5*

18.25 parts of thiophene sulphonyl chloride-2- are added in portions to a solution of 17 parts of n-butyl isourea methyl ether hydrochloride in 100 parts by volume of acetone and 100 parts by volume of 5 N-caustic soda lye, the addition being made at 0–10° while stirring and then the whole is stirred at 15–20° for 2 hours. The alkaline solution is acidified with 2-N-hydrochloric acid and the isourea ether formed is filtered off under suction. It is then decomposed by heating under reflux for 1 hour in 500 parts by volume of 10% hydrochloric acid. After cooling the reaction mixture, it is made alkaline with diluted caustic soda lye, filtered and the N-(thiophene sulphonyl-2)-N'-n-butyl urea is precipitated with diluted hydrochloric acid. After recrystallising from alcohol, the pure substance melts at 152–154.5°.

The following compounds of the general formula:

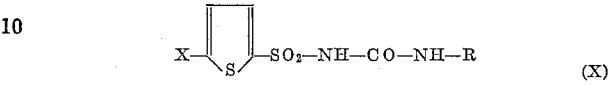

(X)

are obtained in an analogous way:

| No. | X | R | Melting point, degrees |
|---|---|---|---|
| 1 | H | n-$C_3H_7$ | 140–140.5 |
| 2 | H | iso-$C_3H_7$ | 147–148.5 |
| 3 | H | iso-$C_4H_9$ | 179.5–182.5 |
| 4 | H | sec. $C_4H_9$ | 162.5–163.5 |
| 5 | H | iso-$C_5H_{11}$ | 133.5–135.5 |
| 6 | H | cyclohexyl | 185–186 |
| 7 | Cl | iso-$C_3H_7$ | 155–156.5 |
| 8 | Cl | n-$C_4H_9$ | 132.5–133.5 |
| 9 | Cl | iso-$C_4H_9$ | 163–164 |
| 10 | Cl | sec. $C_4H_9$ | 127.5–129 |
| 11 | Cl | iso-$C_5H_{11}$ | 132–133 |
| 12 | Cl | —$CH_2$—$CH$=$CH_2$ | 131.5–132 |
| 13 | Br | n-$C_3H_7$ | 165–166.5 |
| 14 | Br | iso-$C_3H_7$ | 165.5–167.5 |
| 15 | Br | iso-$C_4H_9$ | 166–167.5 |
| 16 | Br | sec. $C_4H_9$ | 135–136 |
| 17 | Br | iso-$C_5H_{11}$ | 131.5–133 |
| 18 | Br | cyclohexyl | 176.5–177 |

Also the following compounds of the general formula:

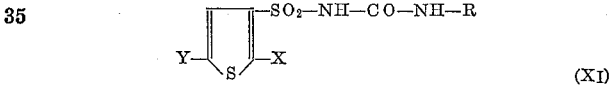

(XI)

are obtained in an analogous manner:

| No. | X | Y | R | Melting point, degrees |
|---|---|---|---|---|
| 19 | Br | Br | n-butyl | 185–186 |
| 20 | Cl | Cl | n-butyl | 159–161 |

What we claim is:
1. A compound of the formula

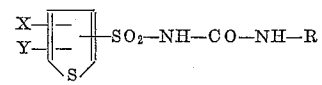

wherein R represents a member selected from the group consisting of lower alkyl, lower alkenyl and cyclohexyl, and X and Y each represent a member selected from the group consisting of hydrogen, Cl and Br.

2. N-(thiophene sulphonyl-2)-N'-n-propyl urea.
3. N-(thiophene sulphonyl-2)-N'-n-butyl urea.
4. N-(thiophene sulphonyl-2)-N'-cyclohexyl urea.
5. N-(5-chlorothiophene sulphonyl-2) - N' - n-propyl urea.
6. N-(5-chlorothiophene sulphonyl-2)-N'-n-butyl urea.
7. N-(5-chlorothiophene sulphonyl-2)-N'-isoamyl urea.
8. N-(5-bromothiophene sulphonyl-2)-N'-n-butyl urea.
9. N-(5-bromothiophene sulphonyl-2) - N' - cyclohexyl urea.
10. N-(2.5-dichlorothiophene sulphonyl-3)-N'-n-butyl urea.

No references cited.